United States Patent [19]

Russell

[11] 4,450,582

[45] May 22, 1984

[54] METHOD AND APPARATUS FOR INCREASING THE CAPACITY OF A SATELLITE TRANSPONDER BY REUSE OF BANDWIDTH

[75] Inventor: Steven P. Russell, Palo Alto, Calif.

[73] Assignee: Vitalink Communications Corporation, Mountain View, Calif.

[21] Appl. No.: 301,566

[22] Filed: Sep. 14, 1981

[51] Int. Cl.³ .............................................. H04B 7/185
[52] U.S. Cl. ......................................... 455/12; 375/3; 455/18
[58] Field of Search .................. 455/12, 13, 18; 375/3; 370/27; 179/170.2, 170.6; 343/6.5 R

[56] References Cited

U.S. PATENT DOCUMENTS

| | | | |
|---|---|---|---|
| 3,363,180 | 1/1968 | Geissler | 455/13 |
| 3,806,653 | 8/1974 | Sommer | 455/12 |
| 3,860,921 | 1/1975 | Wood | 343/6.5 R |
| 3,899,637 | 8/1975 | Willard et al. | 370/27 |
| 4,145,658 | 3/1979 | Acampora et al. | 455/12 |
| 4,291,409 | 9/1981 | Weinberg et al. | 455/17 |

Primary Examiner—Jin F. Ng
Attorney, Agent, or Firm—Donald C. Feix

[57] ABSTRACT

A method and apparatus for increasing the capacity of present and future satellite communication systems transmits signals from correspondent pairs of earth stations simultaneously in channels that have at least a partial overlap in bandwidth. Each receiver at each earth station subtracts from the received composite signal the portion of the composite signal which was transmitted by the receiving earth station. This leaves a desired signal which corresponds to the signal transmitted by the other earth station of the correspondent pair and which is then demodulated. Each receiver at each earth station thus reconstructs an estimated target signal which has the amplitude, delay, frequency and phase of the signal as transmitted from the earth station and retransmitted by the satellite. The reconstructed target signal provides a very precise estimate of the portion of the composite signal transmitted by the earth station. The reconstructed target signal estimate is provided by repeated correlations of known signals against signals which are only partially known in order to produce an output which can be filtered to eliminate further parameters. The further parameters are put back into the estimation process, and said portion of the composite signal is regenerated in this manner of iteration.

17 Claims, 9 Drawing Figures

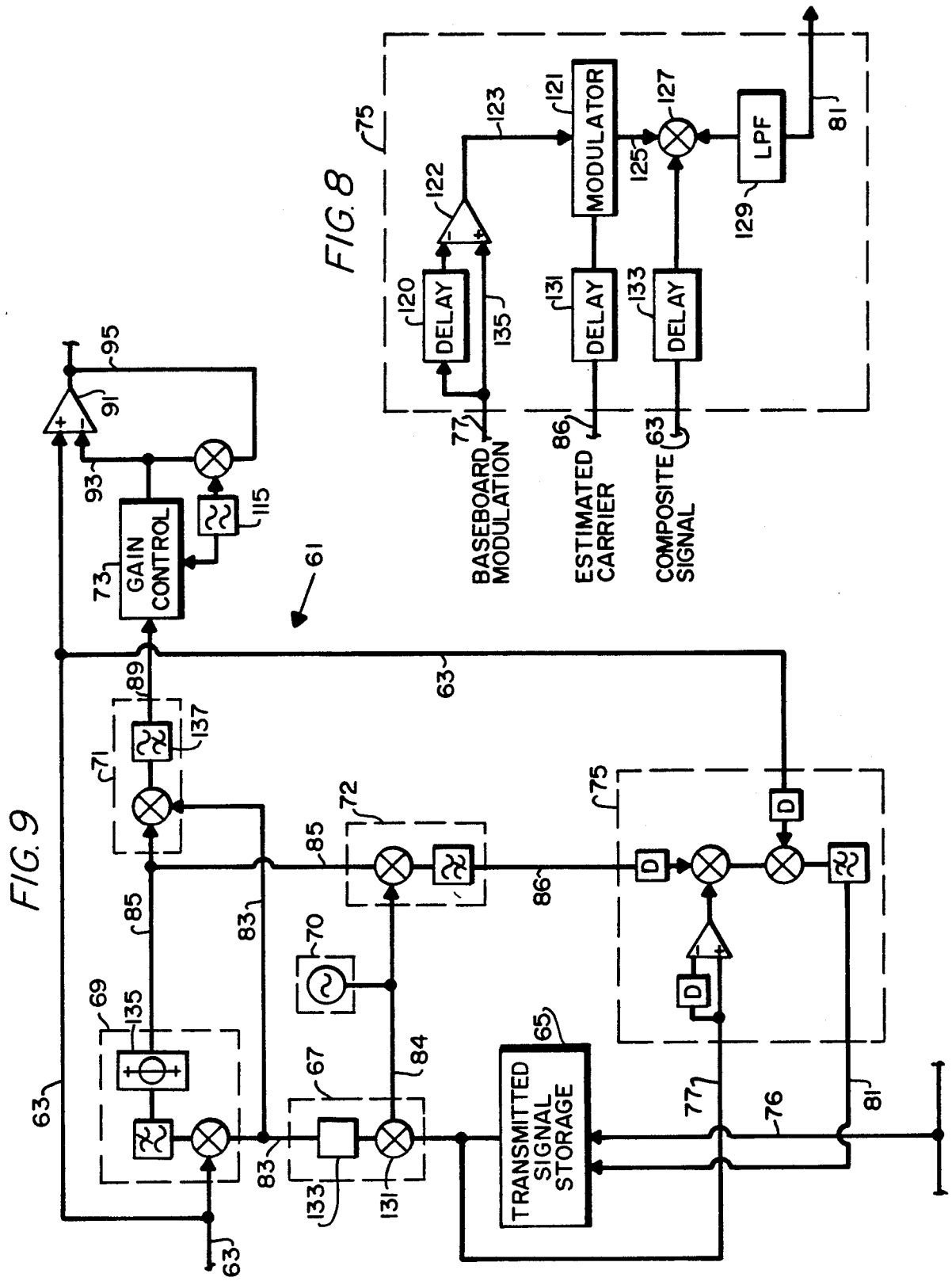

METHOD AND APPARATUS FOR INCREASING THE CAPACITY OF A SATELLITE TRANSPONDER BY REUSE OF BANDWIDTH

BACKGROUND OF THE INVENTION

This invention relates to methods and apparatus for increasing the capacity of present and future satellite communications systems. It relates particularly to methods and apparatus for increasing the capacity by making more bandwidth available by means of reuse (by either partial or complete overlap) of frequency bands.

The cost to launch a communications satellite is substantial. The cost is generally considered to be in excess of thirty million dollars per satellite. For that reason, and because there are only a limited number of satellites presently available for communications systems, it is desirable to increase the utilization of satellites.

The total bandwidth available for use with any given satellite is also a limited, finite amount.

In the conventional, prior art satellite communications systems each earth station transmits a signal in a unique given frequency band, and in particular in a band different from that used by a correspondent station (a station receiving the signal transmitted by the first earth station).

Since there are the limitations, as noted above, on the amount of bandwidth available for communication systems using satellites, there is also a limitation on the number of pairs of earth stations that can communicate with one another.

Since there is a large demand for the use of satellite communications sytems, there are more potential users who want to use satellite communications systems than there is bandwidth available for such users.

SUMMARY OF THE PRESENT INVENTION

It is a primary object of the present invention to alleviate the problem of insufficient bandwidth caused by satellite communications systems using the conventional, prior art communication system of assigning a unique given frequency band to each earth station which is different from that used by a correspondent earth station.

It is a specific object of the present invention to increase the capacity of both present and future satellite communications systems by making more bandwidth available through reuse of frequency bands.

In the present invention correspondent pairs of earth stations communicate through an earth orbiting satellite by transmitting signals from the earth stations simultaneously in channels that have at least a partial overlap in bandwidth. The satellite retransmits to the earth stations a composite signal which is a composite of the signals transmitted by the two earth stations. Each earth station subtracts from the composite signal received at the earth station the portion of the composite signal transmitted by that earth station. This provides a desired signal corresponding to the signal transmitted by the other earth station of the correspondent pair. The desired signal is then demodulated.

Each receiving earth station reconstructs the signal amplitude, the signal delay, the carrier frequency and the carrier phase of the signal transmitted from that earth station to provide a very precise estimate of the portion of the composite signal transmitted by that earth station one quarter second earlier. (One quarter second is the signal round trip time.) That very precise estimate of the portion of the composite signal is subtracted from the composite signal.

The estimate is provided by repeated correlation of known signals against signals which are only partially known in order to produce an output which can be filtered to eliminate further parameters. The further parameters are put back into the estimation process and are used to regenerate said portion of the composite signal in this manner of iteration.

In the present invention each earth station includes a receiver apparatus which includes transmitted signal storage means for delaying a base band representation of the signal transmitted by the earth stations by an amount of time equal to the satellite round trip delay.

The receiver apparatus also includes delay locked loop servo means which are operatively associated with the transmitted signal storage means for producing a voltage which servos the transmitted signal storage means and adjusts the delay to keep the modulation timing of the output of the transmitted signal storage means correct.

Each earth station receiver apparatus also includes wave form generator means which are operatively associated with the transmitted signal storage means for producing an offset target signal which is an estimate of the signal to be subtracted but which has a different carrier frequency and phase than the signal to be subtracted from the composite signal.

The receiver apparatus also includes carrier recovery means which are operatively associated with the wave form generator means for multiplying the composite signal by the offset target signal as received from the output of the wave form generator means. This produces a difference carrier output which is an estimate of the frequency and phase difference between the carrier of the received composite signal and the carrier of the output of the wave form generator means.

The receiver apparatus also include target signal regenerator means operatively associated with the wave form generator means and the carrier recovery means for producing an estimate of the desired signal which is correct except for the proper amplitude.

A gain control associated with the target signal regenerator means corrects the amplitude of the output of the target signal regenerator means.

A differential amplifier subtracts the output of the gain control means from the composite signal to produce the desired signal, which, as noted above, is then demodulated.

The capacity increase of a communications satellite system using the present invention can approach a one hundred percent increase in capacity over the capacity of the conventional, prior art communication systems because each frequency band of the satellite can, in effect, be used twice with the method and apparatus of the present invention.

An extra advantage of the present invention is security; no third earth station can usefully and easily intercept the transmissions between a correspondent pair of earth stations unless voice actuation is used by the correspondent pair of earth stations or unless the third station can somehow get from another source a lot of information about the transmissions from the correspondent pair of earth stations.

The method of frequency reuse of the present invention costs substantially less than the cost of putting new transponders in orbit, and the present invention can also be retrofitted to existing systems.

Satellite communications systems and apparatus and methods which incorporate the structures and techniques described above and which are effective to function as described above constitute specific objects of this invention.

Other and further objects of the present invention will be apparent from the following description and claims and are illustrated in accompanying drawings which, by way of illustration, show preferred embodiments of the present invention and the principles thereof and what are now considered the best mode contemplated for these principles. Other embodiments of the invention embodying the same or equivalent principles may be used and structural changes may be made as desired by those skilled in the art without departing from the invention and the purview of the appended claims.

BRIEF DESCRIPTION OF THE DRAWINGS

FIG. 8 is a block diagram showing further details of the Delay Locked Loop Servo 75 shown in FIG. 5.

FIG. 9 is a view like FIG. 5 but showing the receiver for a binary phase shift keying (BPSK) transmitting and receiving system.

DESCRIPTION OF THE PREFERRED EMBODIMENTS

Figure 1:
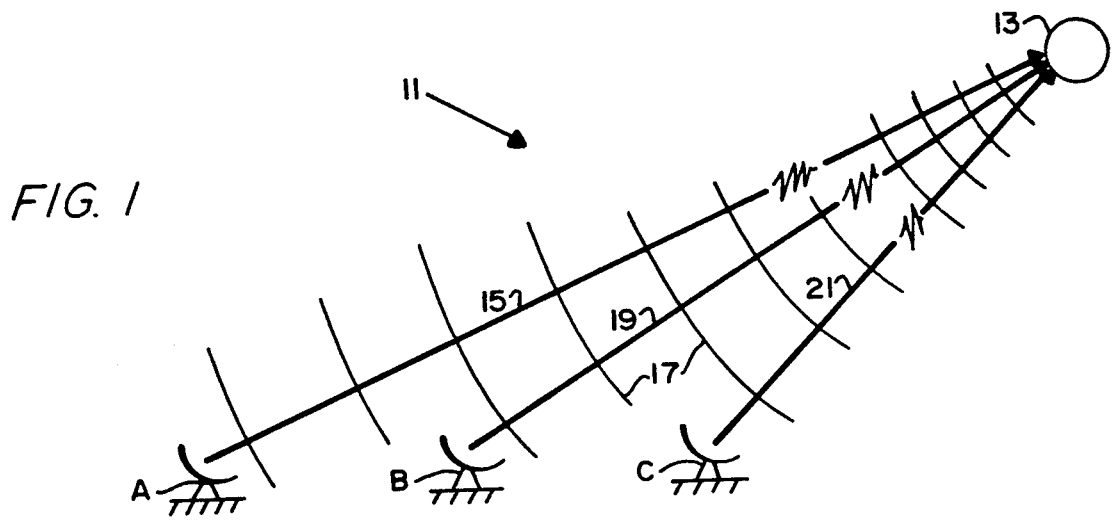
FIG. 1 is a diagramatic view showing how earth stations communicate through an earth orbiting satellite in accordance with one embodiment of the present invention.

A satellite communication system 11 is illustrated in FIG. 1.

In the system 11 a plurality of earth stations A, B and C, communicate through an earth orbiting satellite 13.

Each earth station transmits a signal to the satellite, and that satellite retransmits the signal to all of the earth stations. Thus, for example, the earth station A transmits a signal 15 to the satellite 13, and the signal 15 is retransmitted from the satellite 13 to the earth station as indicated by the wave forms 17 in FIG. 1.

The earth stations B and C transmit respective signals 19 and 21 to the satellite 13, and these signals are retransmitted from the satellite 13 to the earth stations (again as indicated by wave forms 17 in FIG. 1).

Figure 2:
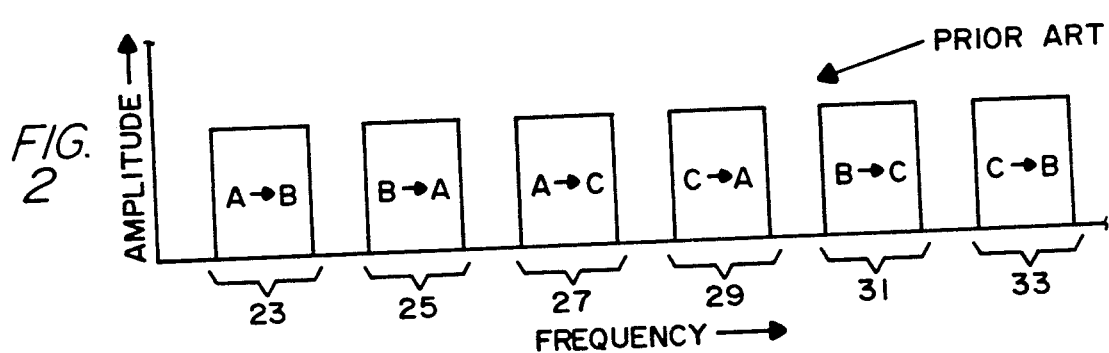
FIG. 2 is a diagram illustrating how earth stations utilize bandwidth in a conventional (prior art) satellite communication system.
Figure 3:
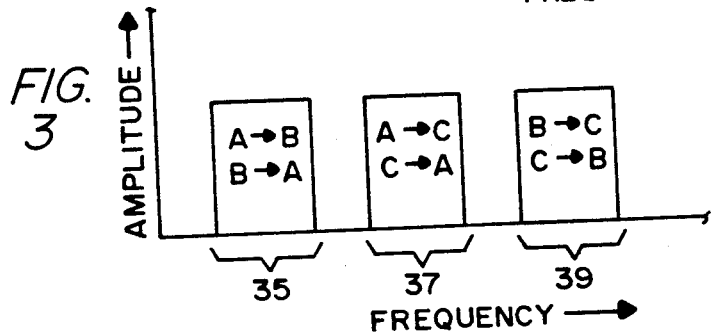
FIG. 3 is a diagram illustrating how a given bandwidth is used twice in a satellite communication system constructed in accordance with one embodiment of the present invention.
Figure 4:
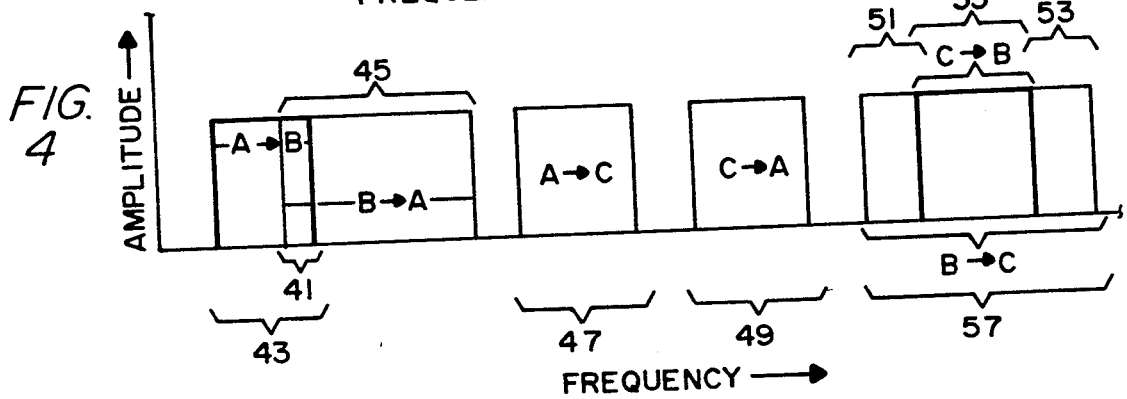
FIG. 4 is a diagram illustrating how overlapping bandwidths are utilized in accordance with another embodiment of the present invention.

As thus far described, the system illustrated in FIG. 1 can perform either the conventional prior art communication technique (as shown in FIG. 2) or the technique for increasing the capacity in accordance with the present invention (as shown in FIG. 3 or FIG. 4).

In the conventional, prior art communication system (as shown in FIG. 2) each earth station transmits a signal in a unique given frequency band, and in particular in a band different from that used by a correspondent station (a station receiving the signal transmitted by the first earth station). This is graphically illustrated in FIG. 2 which is a graph showing the six separate frequency bands 23, 25, 27, 29, 31 and 33 used for communicating between the various pairs of the three earth stations illustrated in FIG. 1.

As illustrated in FIG. 2, communication from the earth station A to the earth station B is on a unique frequency band indicated by the reference numeral 23 in FIG. 2. Communication from the earth station B to the earth station A is on a unique frequency band 25. Each of the four other transmitting and receiving pairs of earth stations communicates on a frequency band which is unique to that transmitting and receiving pair of earth stations.

It can be readily appreciated by looking at FIG. 2 that there is a limitation on the number of pairs of earth stations that can communicate given volume of communication with one another with a given satellite having a given amount of bandwidth.

The system of the present invention increases the utilization of the overall, total bandwidth of the satellite by permitting overlap of the selected bandwidths of the signals to be transmitted between correspondent pairs of the earth stations, such as the correspondent pairs A to B and B to A and the correspondent pairs B to C and C to B.

FIG. 3 illustrates one embodiment of the invention in which the overlap is identical between correspondent stations. The frequency band 35 for the A to B signal is identical to the band 35 for the B to A signal. The band 37 for A to C is identical to the band for C to A, and the same band 39 is used for both B to C and C to B.

FIG. 4 illustrates another embodiment of the invention in which the overlap is not identical. FIG. 4 illustrates a system in which there is partial overlap 41 between the band 43 of the station A to station B signal and the band 45 of the station B to station A signal. There is a complete overlap of the band 55 of the station C to station B signal by the band 57 of the station B to station C signal but not a complete overlap of the station B to station C signal, because the station C signal is larger than the C to B signal by the band portions indicated as 51 and 53. As shown in FIG. 4 some station pairs may have unique frequency bands, such as, for example, the band 47 for the A to C pair and the band 49 for the C to A pair. The overlap of the band of the A and B stations and the B and C stations makes it possible to provide more available band space for various uses, including unique frequency bands like the bands 47 and 49.

The overlap illustrated in FIG. 3 and in FIG. 4 permits greater utilization of the total bandwidth of the satellite because given portions of that overall bandwidth of the satellite can be used twice by correspondent pairs of earth stations.

The present invention, by removing the need for each transmitting and receiving pair of earth stations to have a unique channel, frees up more total channels for other uses.

The present invention subtracts from the composite signal received by an earth station the portion of the composite signal which was originally transmitted by the receiving earth station. This permits the remaining portion of the received signal (that is, the signal as transmitted by the other earth station in the correspondent pair) to be demodulated.

The present invention thus strips away the portion of the composite signal which corresponds to the signal transmitted by the receiving earth station to expose the partner's signal for conventional demodulation.

The present invention increases the capacity by making more of the overall satellite bandwidth available.

It also has the benefit of hiding the signals so that only a party to the transmission can receive the signals. Anybody who is not a party to the transmission cannot receive the signals.

The present invention, in effect, subtracts out the known, transmitted interference to leave the desired signal for demodulation.

Figure 5:
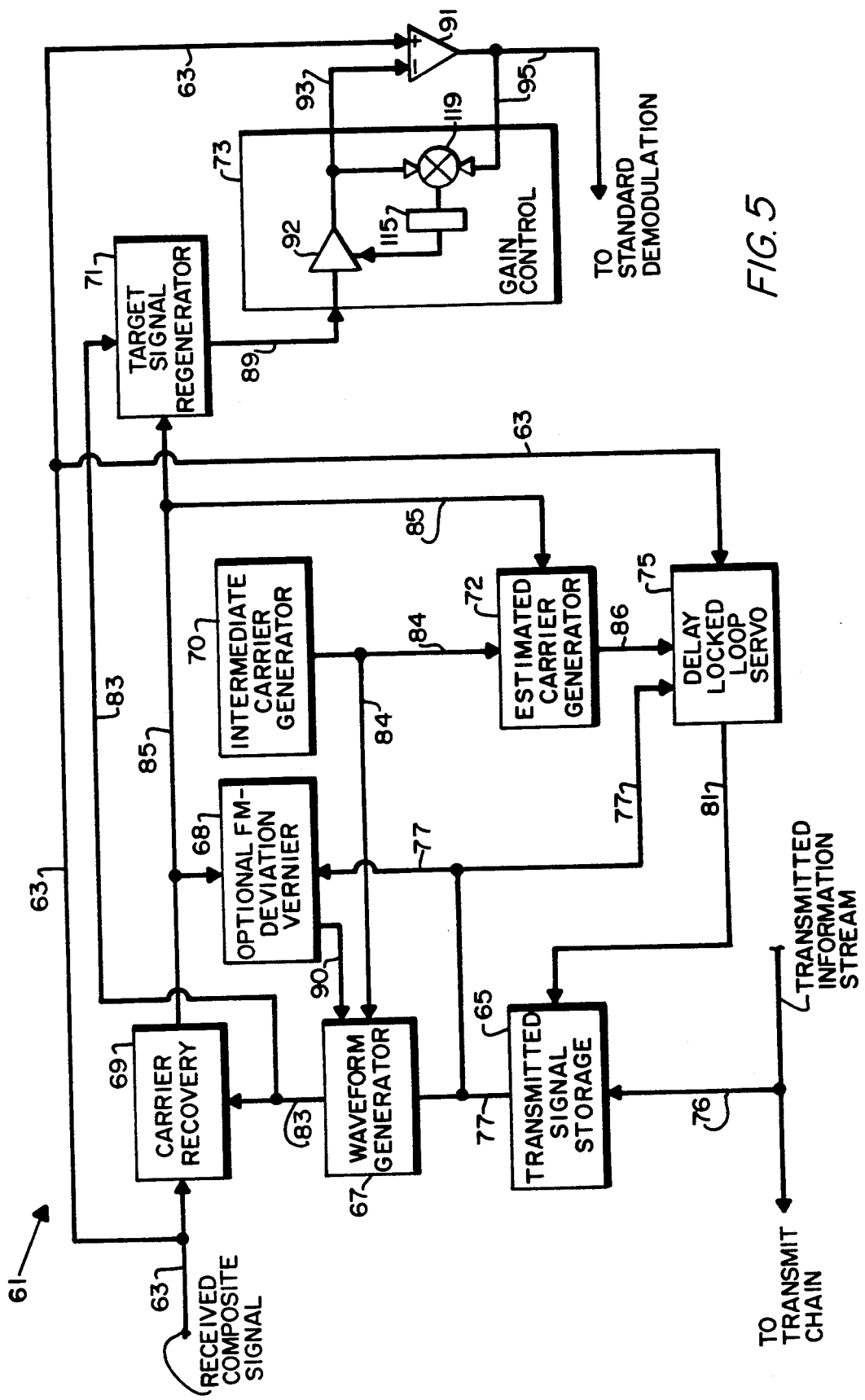
FIG. 5 is a block diagram illustrating the subsystems for a receive channel incorporated in an earth station having bandwidth overlap as illustrated in either FIG. 3 or FIG. 4.

FIG. 5 illustrates details of the receiver channel at an earth station constructed in accordance with one embodiment of the present invention for utilizing band overlap of the kind illustrated in FIGS. 3 and 4.

The receiver channel 61 shown in FIG. 5 is useable for any conventional modulation system, such as binary phase shift keying (BPSK), minimum shift keying (MSK), quadra phase shift keying (QPSK), eight phase shift keying (8PSK), and frequency modulation (FM), and amplitude modulation (AM).

A simplified receiver used for BPSK only is illustrated in FIG. 9 (and will be described in more detail below).

With continued reference to FIG. 5, certain terms will be used in this description and are listed below:

Composite Signal: This is the sum A+B received on the line 63 at both the earth station A and the earth station B.

Target Signal: The signal to be canceled. In this example it is signal G·A where G represents the linear amplification, frequency translation, and known filtering of A without filtering effects which are not reconstructable easily. The present invention can also take account of G·A+ε(A) where ε(A) includes non-linearities and filtering effects which are more complicated to reproduce.

Desired Signal: Signal G·B where G represents linear amplification as in G·A above.

Estimated Target Signal: An estimate of the Target Signal produced at earth station A. This signal is subtracted from the composite signal to give the Estimated Desired Signal.

Offset Target Signal: The Estimated Target Signal with incorrect radio frequency (RF) frequency, phase, and amplitude.

Difference Carrier: A sinusoidal wave having a frequency and phase equal to the RF frequency and phase difference between the Offset Target Signal and the Target Signal. This carrier is created at the receiver to aid in the processing.

Baseband Modulation: The baseband signal which is stored by the Transmittal Signal Storage and which is used by the Waveform Generator to construct the Offset Target Signal.

Estimated Carrier: The product, properly filtered to remove either the upper sideband or the lower sideband as appropriate, of the Difference Carrier and a carrier generated by the Intermediate Carrier Generator. The latter carrier is modulated by the Waveform Generator to produce the Offset Target Signal.

Estimated Desired Signal: The difference between the Composite Signal and the Estimated Target Signal.

At this point it should also be noted that the signal retransmitted from the satellite 13 for the correspondent pairs of earth stations A and B (as shown by the wave forms 17 in FIG. 1) is a complex signal of the form G·A+G·B+ε(A)+ε(B) plus intermodulation effects between A and B introduced by non-linearities and thermal noise and some residual non-linear effects (all of which are small enough for signal demodulation with adequate quality).

The following table is a summary of the functions shown in FIG. 5:

Transmitted Signal Storage 65: Delays a baseband representation from the line 76 of the Transmitted Signal for the satellite round-trip time.

Waveform Generator 67: Produces an estimate on the line 83 of the Target Signal but with a different carrier frequency and phase. This is called the Offset Target Signal.

Carrier Recovery 69: Multiplies the Composite Signal on the line 63 by the Offset Target Signal on the line 83 to produce on the line 85 an estimate of the frequency and phase difference between the Carrier and the Offset Carrier. This estimate is filtered in a phase locked loop or other narrow-band filter to produce on the line 85 the Difference Carrier by precisely extracting the lower half of the product of the Offset Target Signal with the Composite Signal.

Target Signal Regenerator 71: Multiplies the Difference Carrier on the line 85 by the Offset Target Signal on the line 83 to produce on the line 89 an estimate of the Target Signal. This gives the Estimated Target Signal on the line 89 without the proper amplitude.

Gain Control 73: Corrects the amplitude of the Target Signal Regenerator output on the line 89 thus yielding the Estimated Target Signal on the line 93. This is done by minimizing the RMS correlation between the Estimated Target Signal on the line 93 and the Estimated Desired Signal on the line 95.

Delay Locked Loop Servo 75: Produces a voltage on the line 81 to servo the Transmitted Signal Storage 65 to correct the modulation timing.

Intermediate Carrier Generator 70: Produces the Intermediate Carrier, an intermediate frequency sinusoid having low phase noise, on the line 84. The sinusoidal frequency is chosen to ease the design of the filters in the Carrier Recovery 69 and Target Signal Regenerator 71.

Estimated Carrier Generator 72: Mixes the Difference Carrier on the line 85 with the Intermediate Carrier on the line 84 to produce an estimate of the Target Signal Carrier on the line 86.

Optimal FM Deviation Vernier: Produces a control signal on the line 90 which is proportional to the residual modulation in the Difference Carrier on the line 85. The control signal is used to adjust the modulator in the Waveform Generator 67 in order to eliminate the excess modulation. The control signal is produced by mixing the Baseband Modulating Signal on the line 77 with the Difference Carrier on the line 85 after the Difference Carrier is demodulated in the Optional FM Deviation Vernier 68. In many systems the Vernier 68 is unnecessary and would not be employed.

In FIG. 5 the Transmitted Signal Storage (Block 65) stores a representation of the transmitted signal from the line 76 for a time precisely equal to the satellite round-trip delay and supplies that signal to the Waveform Generator 67 on the line 77.

A Delay Locked Loop Servo 75 is connected to the Transmitted Signal storage by the lines 77 and 81 and constantly adjusts this delay within a maximum long-term variation of several milliseconds and a short-term variation of several microseconds.

The Transmitted Signal Storage 65 for BPSK is a digital store which stores each bit transmitted.

The Transmitted Signal Storage 65 varies the delay to provide the exact delay necessary for effective cancellation. This is necessary to accommodate different satellite orbital positions in the long run, and is necessary in the short run to accommodate for the slow drift in satellite round-trip delay due to tidal changes, drifts in satellite location, orbital eccentricity, and atmospheric changes.

The Waveform Generator (Block 67) produces from the Intermediate Carrier Generator 70 and from the Transmitted Signal Storage 65 an estimate of the signal which is to be canceled and supplies this estimate to the Carrier Recovery 69 on a line 83. This preliminary estimate has the incorrect RF frequency, phase, and amplitude. The modulation, however, does have the correct phase. For this reason, we call this estimate the Offset Target Signal. For example, with BPSK the Waveform Generator 67 produces a bi-phase modulated sinewave. The sinewave will not have the same frequency and phase as the wave which is to be canceled, but the modulation phase changes will occur at the right time and the phase changes will occur at the proper rate.

The Carrier Recovery Unit (Block 69) multiplies the received composite signal on the line 63 by the output of the Waveform Generator 67 on the line 83. The product is filtered to remove one of the sidebands. Because the Waveform Generator output on line 83 is highly correlated with the signal to be canceled but is not at all correlated with the signal to be received, the multiplication of the two signals eliminates the modulation of the target signal while spreading the desired signal over a broadband. The very broadband noise (twice the modulation bandwidth) can be filtered out leaving only a narrowband (bandwidth set by the oscillator phase noise) "carrier signal". This latter signal is a somewhat noisy estimate of the error in the RF frequency and phase of the Waveform Generator. The estimate is filtered by a phase-locked-loop within the unit 69 to produce an accurate estimate of the RF error. This error waveform on the line 85 is a sinewave having a frequency and phase such that when the sinewave is multiplied by the Offset Target Signal on the line 83 and is filtered, the Estimated Target Signal on the line 89 will result.

We call this error signal on the line 85 the Difference Carrier, and it is supplied to the Target Signal Regenerator by the line 85.

The Target Signal Regenerator (Block 71) multiplies the output of the Waveform Generator 67 as received on the line 83 with the Difference Carrier produced by the Carrier Recovery Unit and received on line 85 to produce, after filtering, the Estimated Target Signal on the line 89. This estimate is correct in every aspect except for the distortions introduced by non-linearities, filtering errors and mismatch, and gain errors. The estimate is supplied to the Gain Control 73 on the line 89.

The Gain Control Unit (Block 73) controls the gain of a buffer amplifier 92 amplifying the output of Target Signal Regenerator 71. The gain is driven to a value giving the Estimated Target Signal on the line 93 its correct amplitude. This is done by minimizing the correlation between the Estimated Target Signal on the line 89 and the Estimated Desired Signal on the line 95.

The Estimated Desired Signal on the line 95 is generated through the differential amplifier 91 by subtracting the Estimated Target Signal on the line 93 from the Composite Signal on the line 63.

The Delay Locked Loop Servo (Block 75) controls the timing of the modulation by controlling the signal delay experienced by the signal in the Transmitted Signal Storage. This is done in a variety of ways. The basic approach is to correlate with the composite signal on the line 63 a second signal produced by modulating the Estimated Carrier produced on the line 86 with the differentiated (or differenced) baseband modulation on line 77. The whole Delay Locked Loop is formed by the blocks 65 and 75.

The Optional FM Deviation Vernier 68 was described above under that caption.

The subsystems of receiver channel 61 will now be described in more detail.

The purpose of the Transmitted Signal Storage Unit 65 is to produce an analog or a digital representation of the transmitted data suitably delayed so that the representation passed on to the remaining subsystems is phased exactly with the arriving wave.

Figure 6:
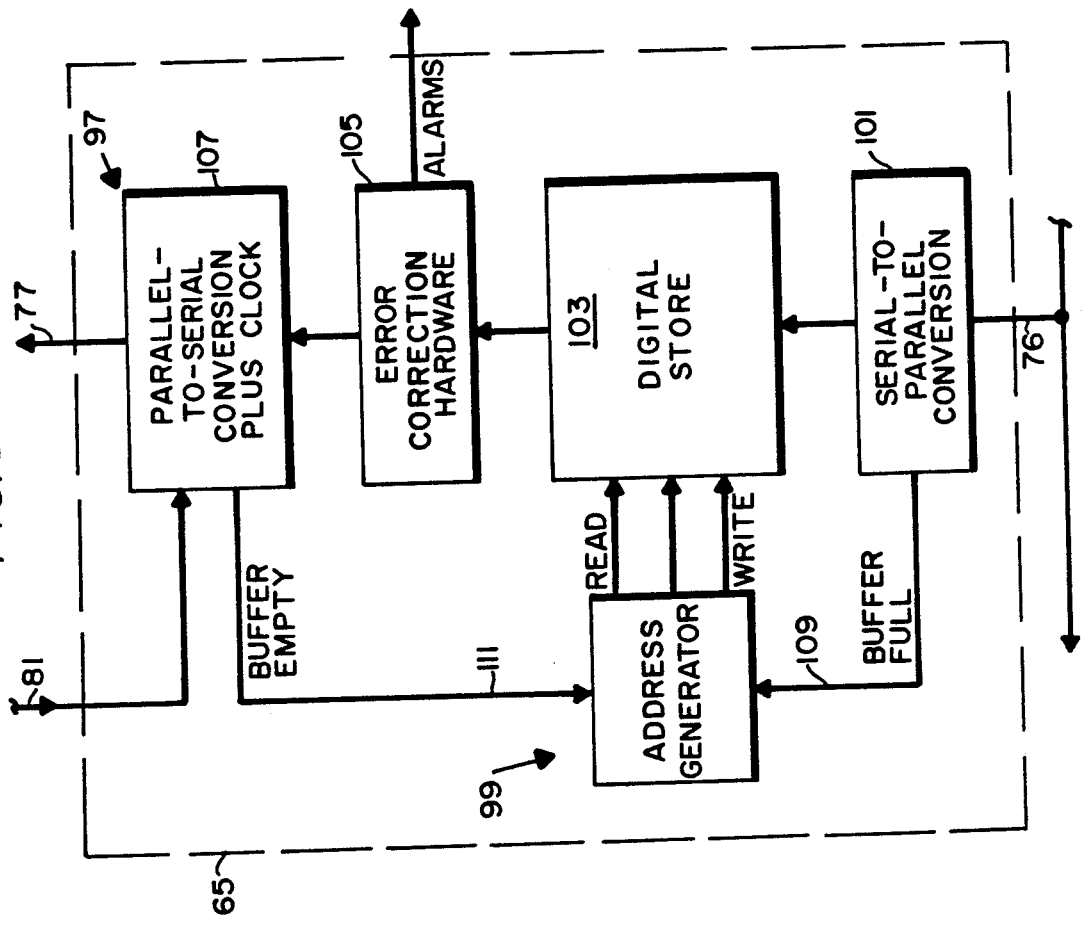
FIG. 6 is a block diagram showing details of the Transmitted Signal Storage 65 of the receive channel shown in FIG. 5.

FIG. 6 is a block diagram of the Transmit Signal Storage.

The Transmit Signal Storage 65 consists of two fundamental parts, a digital delay device 97 and a control system 99.

The digital delay device 97 is shown on the right side of FIG. 6 device itself. The digital delay device 97 includes a serial-to-parallel conversion 101, a large digital store 103, error correction hardware 105 so that errors in the digital store will not affect the integrity of the data, and a parallel-to-serial conversion plus clock 107 for producing the synchronized data stream going out on line 77. When analog modulations are used, the foregoing Parallel/Serial converters 101 and 107 are replaced by Analog/Digital and Digital/Analog converters.

The Control System 99 is labeled "Address Generator" and is shown on the left side of FIG. 6. The Address Generator includes two counters which generate addresses for reading and writing data into the fixed dynamic RAM array of the store 103. The address generator remembers two addresses: the address it is writing to and the address it is reading from. Each time the address generator gets a "buffer-full" message on the line 109 from the serial-to-parallel converter 101 it writes the parallel word that has just been constructed into the write address, and it then decrements (increments) the write address. Similarly when it receives a buffer empty signal from the parallel-to-serial converter 107 it reads the contents of the read/address to the parallel-to-serial converter 107 over the line 111 and decrements (increments) the read/address. When either of the addresses reach zero they are "wrapped around" to the top of the dynamic RAM store. In this way a "rubber store" is constructed which allows the effective delay between the serial-to-parallel converter 101 and the input to the parallel-to-serial converter 107 to vary according to the timing and data rate demands on the system. Between these two convertors, error correction hardware 105 is provided which can detect and correct one bit error in each word. This error correction hardware also isolates the chip that caused the error and rings alarms.

The final part of the Transmitted Signal Storage 65 is the circuitry which precisely phases the output data on the line 77 to the data stream currently being received that we transmitted by the earth station in which this hardware is installed. This function is provided in the parallel-to-serial converter 107 shown in FIG. 6. This unit consists of a loadable shift register or a pair of such shift registers which in parallel load a 16 bit word and then read the word out in serial. The rate at which the word is read out is controlled by a stable crystal clock which is optimized for short term stability. This crystal clock is adjusted by the data phasing servo voltage on the line 81 produced in the Delay Locked Loop Servo 75 described above. The nominal clock rate is slightly slower than the data rate. When the system is started, a value for the delay that is smaller than any value which will be encountered is used to define the initial values of the read and write counters. The rubber store thus drifts into synchronization, and lock is acquired.

Figure 7:
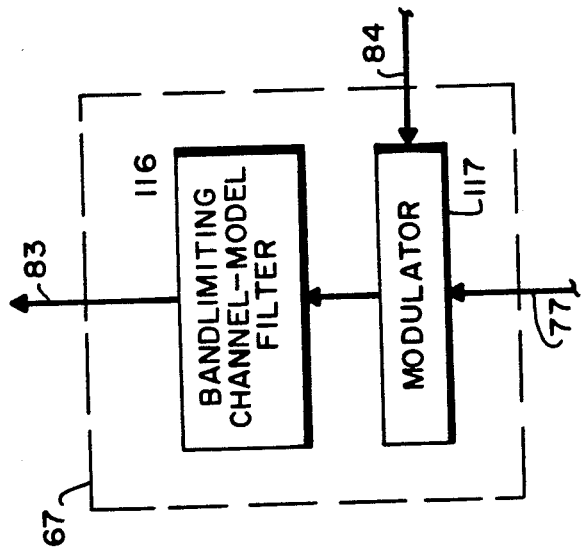
FIG. 7 is a block diagram showing further details of the Waveform Generator 67 as shown in FIG. 5.

FIG. 7 shows the Waveform Generator 67 which takes the data from the Signal Storage Unit 65 and uses it to modulate with modulator 117 the Intermediate Carrier on the line 84. For BPSK, the modulation simply involves phase inversion and filtering. For other modulations the modulator is more complicated. The Waveform Generator may also include filtering 116 (shown in FIG. 7) to represent the effects of the satellite bandpass filters, etc.

In the Carrier Recovery Unit 69 the Offset Target Signal is mixed with the Composite Signal; this mixing collapses the Target Signal into a sinusoid with possibly some residual AM modulation. At the same time, the Desired Signal is spread. Thus, the power spectral density of the collapsed Target Signal (which now becomes the Difference Carrier) is very high. The mixed output is passed through a narrow-band phase locked loop to select the lower sideband of the mixer output and to reject most of the noise. The output of the phase-locked loop is the Difference Carrier on the line 85. An output filter on the phase-locked loop may be used to change the phase of the Difference Carrier to account for signal propogation delay within the circuits of this invention.

The Target Signal Regenerator 71 generates the Estimated Target Signal correctly except for the amplitude. The regeneration is accomplished by mixing the Difference Carrier on line 85 with the Offset Target Signal on the line 83 generated by the Waveform Generator 67. The upper sideband of this mixing is extracted and passed on to the Gain Control Unit 73.

The Gain Control 73 works by nulling out the correlation between the Estimated Desired Signal on the line 95 and the Estimated Target Signal on the line 89. The output of the Target Signal Regenerator 71 is passed into the variable Gain Control 73. Within the Gain Control 73, the gain of a buffer amplifier 92 is controlled by the output of a low-pass filter 115. The low-pass filter 115 sets the proper value of the variable gain by filtering the output of a mixer 119 which mixes the Estimated Target Signal on the line 93 with the Estimated Desired Signal on the line 95. Whenever a DC component results from correlation between the two signals, it changes the variable gain in the direction necessary to cancel the DC component and the corresponding signal correlation.

The Estimated Desired Signal on the line 95 is generated through the differential amplifier 91 by subtracting the Estimated Target Signal on the line 93 from the Composite Signal on the line 63.

The Delay Locked Loop Servo 75 shown in FIG. 8 keeps the Baseband Modulation phased with the received target modulation.

The Servo 75 uses signals from several of the other subsystems. As shown in FIG. 8, the Estimated Carrier of the Target Signal is first derived in the Estimated Carrier Generator 72 shown in FIG. 5.

The Baseband Modulation on line 77 is differenced, in the delay 120 and the differential amplifier 122, and the result on 123 modulates the Estimated Carrier in the Modulator 121. The result produced on the line 125 is mixed in the mixer 127 with the composite signal, and the integrated output from the low pass filter 129 produced on the line 81 servos the modulation timing in the storage 65. The delays 131 and 133 are smaller than the delay 120 and serve to compensate for the "delay distortion" in 123 introduced by the impossibility of adding an anti-delay element to line 135.

The operation of the FIG. 5 embodiment as described below includes situations in which the correspondant earth stations transmit signals on bandwidths which are identical as illustrated at 35, 37 and 39 in FIG. 3, or with partial overlap as illustrated at 41, or with total overlap as illustrated at 55 in FIG. 4.

The operation of the invention is now described in a transmission connecting two earth stations which we will call A and B respectively. Earth station A impresses a data signal on a carrier and transmits this modulated signal 15 to the satellite 13. The satellite receives the modulated signal, changes its frequency and retransmits that received signal back to earth. The earth station B impresses a separate information signal on a carrier in a similar fashion and transmits the signal 19 to the satellite 13 in the same band as the signal transmitted by earth station A. The satellite receives the signal from B and retransmits it to earth as it did with A's signal. Both the signals from A and B thus are transmitted by the satellite 13 (as represented by the waveforms 17) into new bands which overlap to the same degree as the bands originally transmitted.

Both stations A and B receive this composite signal which consists of the signals transmitted by each of them in translated frequency.

Referring to FIG. 5 we now follow the processing of the composite signals at earth station A.

Earth station A receives a signal from B which it must demodulate. This signal from B is hidden in the signal that A itself originally transmitted.

In order to remove the interfering signal (the interfering signal from station A as retransmitted from the satellite), the unknown but slowly varying parameters—the modulation timing, the carrier frequency, the carrier phase and the target signal amplitude—of the interfering signal must be estimated.

The essence of the estimation process consists of repeated correlation of known signals against signals which are only partially known in order to produce an output which can be filtered to estimate further parameters. These further parameters are cranked back into the estimation process and in this manner of iteration the target signal is regenerated.

As shown in FIG. 5 the received composite signal is split into two parts in earth station A.

A first part referred to below is sent forward to the amplifier 91 for demodulation after the interfering signal is removed.

A second part is sent to the Carrier Recovery unit 69 where reconstruction of the interfering signal for removal begins in a first correlation.

The result of the correlation in the unit 69 is useable to produce an estimate of the unknown target signal carrier frequency and carrier phase.

The subsequent correlations performed in the target signal regenerator 71, the gain control 73 and differential amplifier 91 produce the estimated desired signal as described above.

This method and technique is performed for the various types of overlap as shown at 35–39, 41 and 55–57 in FIGS. 3 and 4.

FIG. 9, as noted above, shows a simplified form of receiver which is specific to the BPSK transmission technique.

The components in FIG. 9 which correspond to the components in FIG. 5 are indicated by corresponding reference numerals.

As can be seen by looking at FIG. 9, the receiver 61 for the BPSK transmission has the same basic components as the FIG. 5 embodiment.

The difference between the receiver 61 shown in FIG. 9 and that shown in FIG. 5 is that the BPSK receiver is implemented in FIG. 9 with simple components. That is, while the blocks in FIG. 5 require some sophistication for some embodiments of the invention, the FIG. 9 embodiment uses nothing more complicated than mixers, filters and simple crystal oscillators. For example, the Waveform Generator 67 in the FIG. 9 embodiment uses a mixer 131 and a band-pass filter 133.

Similarly, the Carrier Recovery 69 in FIG. 9 uses only a mixer and a filter with the addition of the phase-compensation network 135.

The Target Signal Regenerator 71 consists of the same simple mixer with a filter (in this case a high-pass filter 137) to select the desired sideband.

The operation of the FIG. 9 embodiment is like that described above for the FIG. 5 embodiment and will therefore not be repeated at this point.

While I have illustrated and described the preferred embodiments of our invention, it is to be understood that these are capable of variation and modification, and I therefore do not wish to be limited to the precise details set forth, but desire to avail myself of such changes and alterations as fall within the purview of the following claims.

I claim:

1. A method of communicating between correspondent pairs of earth stations through an earth orbiting satellite and comprising, transmitting signals from the earth stations simultaneously in channels that have at least a partial overlap in bandwidth, retransmitting from the satellite to the earth stations a composite signal which is a composite of the signals transmitted by the two earth stations, storing at each receiving earth station information constituting a base band representation of the signal transmitted by the receiving earth station, delaying the stored information by an amount of time equal to the satellite round trip delay, preparing an estimate of the portion of the composite signal that is transmitted by the receiving earth station by processing the composite signal using the stored information, subtracting from the composite signal received at each earth station the portion of the composite signal transmitted by that earth station to provide a desired signal corresponding to the signal transmitted by the other earth station of the correspondent pair, and demodulating the desired signal.

2. The invention defined in claim 1 including reconstructing at each receiving earth station the signal amplitude, the signal delay, the carrier frequency and the carrier phase of the signal transmitted from that earth station to provide a very precise estimate of the portion of the composite signal transmitted by that earth station for subtraction from the composite signal.

3. The invention defined in claim 2 including providing said estimate by repeated correlation of known signals against signals which are only partially known in order to produce an output which can be filtered to eliminate further parameters, putting the further parameters back into the estimation process and regenerating said portion of the composite signal in this manner of iteration.

4. Apparatus for increasing the capacity of an earth orbiting satellite by communicating between correspondent pairs of earth stations in channnels that have at least a partial overlap in bandwidth, said apparatus comprising, first transmitting means at a first earth station of the correspondent pair for transmitting a first signal to the satellite in a first frequency band for retransmission by the satellite to a second earth station of the correspondent pair, second transmitting means at a second earth station of the correspondent pair for transmitting a second signal to the satellite in a second frequency band for retransmission by the satellite to the first earth station of the correspondent pair, said first frequency band having at least partial overlap with the second frequency band so that each earth station receives a composite signal which is a composite of the first and second signals transmitted from the earth stations, receiver means at each earth station for subtracting from the received composite signal the portion of the composite signal transmitted by that earth station to provide a desired signal corresponding to the signal transmitted by the other earth station of the correspondent pair, said receiver means including transmitted storage means for storing information constituting a baseband representation of the signal transmitted by that earth station and for delaying the information by an amount of time equal to the satellite round trip delay, said receiver means also including means for preparing an estimate of the portion of the composite signal that is transmitted by that earth station by processing the composite signal using the stored information, and demodulation means for demodulating the desired signal at each earth station.

5. The invention defined in claim 4 wherein each receiver means include delay locked loop servo means operatively associated with the transmitted signal storage means for producing a voltage which servos the transmitted signal storage means and adjusts the delay to keep the modulation timing of the output of the transmitted signal storage means correct.

6. The invention defined in claim 5 wherein each receiver means include wave form generator means operatively associated with the transmitted signal storage means for producing an offset target signal which is an estimate of the signal to be subtracted but which has a different carrier frequency and phase than the signal to be subtracted from the composite signal.

7. The invention defined in claim 6 wherein each receiver means include carrier recovery means operatively associated with the wave form generator means for multiplying the composite signal by the offset target signal as received from the output of the wave form generator means to produce a difference carrier output which is an estimate of the frequency and phase difference between the carrier of the received composite signal and the carrier of the output of the wave form generator means.

8. The invention defined in claim 7 wherein each receiver means include target signal regenerator means operatively associated with the wave form generator means and the carrier recovery means for producing an estimate of the desired signal which is correct except for the proper amplitude.

9. The invention defined in claim 8 wherein each receiver means include gain control means operatively associated with the target signal regenerator means for correcting the amplitude of the output of the target signal regenerator means.

10. The invention defined in claim 9 wherein each receiver means include differential amplifier means for subtracting the output of the gain control means from the composite signal to produce the desired signal.

11. A receiver for an earth station of the kind which receives a composite signal from an earth orbiting satellite and the composite signal includes both a first signal transmitted from the earth station to the satellite on a first channel and a second signal transmitted from another earth station to the satellite on a second channel and wherein there is at least partial overlap of the first and second channels so that the first signal must be subtracted from the composite signal at the receiving earth station before the second signal can be demodulated, said receiver comprising, estimated target signal means for reconstructing an estimated target signal which has the amplitude, delay, frequency and phase of the first signal as retransmitted from the satellite and received at the earth station, the estimate target signal means include transmitted signal storage means for delaying a baseband representation of the signal transmitted by the earth station by an amount of time equal to the satellite round trip delay, and subtraction means for subtracting the estimated target signal from the composite signal to produce a desired signal which corresponds to the second signal and which can be demodulated at the earth station.

12. The invention defined in claim 11 wherein the estimated target signal means include delay locked loop servo means operatively associated with the transmitted signal storage means for producing a voltage which servos the transmitted signal storage means and adjusts the delay to keep the modulation timing of the output of the transmitted signal storage means correct.

13. The invention defined in claim 12 wherein the estimated target signal means include wave form generator means operatively associated with the transmitted signal storage means for producing an offset target signal which is an estimate of the signal to be subtracted but which has a different carrier frequency and phase than the signal to be subtracted from the composite signal.

14. The invention defined in claim 13 wherein the estimated target signal means include carrier recovery means operatively associated with the wave form generator means for multiplying the composite signal by the offset target signal as received from the output of the wave form generator means to produce a difference carrier output which is an estimate of the frequency and phase difference between the carrier of the received composite signal and the carrier of the output of the wave form generator means.

15. The invention defined in claim 14 wherein the estimated target signal means include target signal regenerator means operatively associated with the wave form generator means and the carrier recovery means for producing an estimate of the desired signal which is correct except for the proper amplitude.

16. The invention defined in claim 15 wherein the estimated target signal means include gain control means operatively associated with the target signal regenerator means for correcting the amplitude of the output of the target signal regenerator means.

17. The invention defined in claim 16 wherein the subtraction means include differential amplifier means for subtracting the output of the gain control means from the composite signal to produce the desired signal.

* * * * *